Patented May 9, 1950

2,507,135

UNITED STATES PATENT OFFICE 2,507,135

METHOD FOR PRODUCING PURE PAPAVARINE HYDROCHLORIDE

Manuel Mannheim Baizer, Flushing, N. Y., assignor to New York Quinine and Chemical Works, Incorporated, Brooklyn, N. Y., a corporation of New York No Drawing. Application July 23, 1948, Serial No. 40,420

4 Claims. (Cl. 260—285)

My invention relates to an improvement in the manufacture of papaverine hydrochloride. In particular, it is concerned with an improvement in the manufacture of highly refined papaverine hydrochloride from crude papaverine, and with a purified and improved papaverine hydrochloride as a new product of manufacture.

Papaverine hydrochloride is the hydrochloride of the alkaloid papaverine prepared "from opium or synthetically" (Pharmacopoeia of the United States, Thirteenth Revision, page 376). However, in order to qualify for medical acceptance, papaverine hydrochloride must respond to the minimum tests for purity required by the U. S. P. One of the requirements is a test for crytopine, thebaine, or other organic impurities by which 50 mg. of papaverine hydrochloride dissolved in 2 cc. of sulfuric acid, must give a solution the color of which "is not deeper than pale pink, or not more than slightly brown."

The manufacture of products meeting these tests of purity has been described in literature, but it is generally recognized that these known purification processes are not commercially satisfactory in that there is considerable variation from lot to lot in the intensity of the color produced by the final product in the sulfuric acid test of the U. S. P. and the processes are uneconomical.

G. E. Foster in a "Note on Commercial Papaverine" published in the Analyst 71, 139–40 (1946) states that "many of the color reactions attributed to papaverine are due to impurities with which the alkaloid is often contaminated. Of particular interest is the observation of Pictet and Kramers (Ber. 1910, 43, 1329), who found that pure papaverine gave no color with cold concentrated sulfuric acid and that the brilliant purple reaction frequently observed was due to cryptopine. The work of these authors has no doubt resulted in the appropriate monographs of the British Pharmaceutical Codex, the French Codex, and the German Pharmacopoeia stating that the alkaloid and its hydrochloride give no color with cold sulphuric acid."

Hesse, Annalen der Chemie 153, 75, 1870, was the first to separate papaverine from opium bases by means of oxalic acid and purify the resulting salt by recrystallization from boiling water. He considered the salt pure when it dissolved in the dry state in concentrated sulfuric acid without coloration "which as a rule occurs only after several recrystallizations." The oxalic acid was removed from the solution of the salt in hot water by means of calcium chloride, and the base precipitated with ammonia and obtained pure by recrystallization from boiling alcohol.

Beckett and Wright, Journal of the Chemical Society, 1876, I, 653, state that the impurity of the products is probably occasioned by the great difficulty experienced in completely freeing papaverine by crystallization from another substance which is precipitated along with it and persistently adheres to it. They describe the purification of a "crude impure papaverine containing much coloring matter, and other substances." The impure base and oxalic acid were dissolved in hot water, and the resulting crystals of the acid oxalate were recrystallized 4 or 5 times from hot water. Finally the hot solution of nearly colorless salt was poured into excess ammonia and the resulting precipitate of the free base was dried and recrystallized 5 times from boiling benzene. Only by this laborious procedure were "perfectly colorless crystals" obtained. The authors report no color test with cold concentrated sulfuric acid or other alkaloid reagents, and it is not certain therefore that their product was sufficiently pure to meet the tests of the various pharmacopoeias.

Pictet and Kramers (l. c.) purified a "commercial" papaverine by converting it into the acid oxalate salt according to Hesse (l. c.). "These crystals frequently still show a weak coloration with sulfuric acid in which case they are recrystallized once or twice from water. The salt is then absolutely pure and dissolves in concentrated sulfuric acid without coloration."

Foster (l. c.) investigated the cryptopine color reaction. He purified "commercial" papaverine by fractional crystallization of the acid oxalate according to Pictet and Kramers (l. c.). The alkaloid recovered from the salt still contained a trace of cryptopine which was removed by passing a chloroform solution of the alkaloid through a column of aluminum oxide. "In this way papaverine giving no color reaction with cold sulfuric acid was obtained."

"Commercial" papaverine as described in these references is a white, powdery product obtained by refinement of crude impure papaverine. While it is free from the bulk of impurities, it is not sufficiently pure to satisfy the pharmacopoeial tests but requires further purification as described for instance by Pictet and Kramers (l. c.) and Foster (l. c.). The entire purification process as now known in literature and extending from the crude impure papaverine "containing much coloring matter, and other substances" (Beckett and Wright, l. c.) to the pharmacopoeial substance, involves a great many recrystallization steps, usually seven and sometimes as many as 20, and is too cumbersome, time consuming and expensive to be commercially economical. In commercial production, 3-4 months are usually required for the complete process. Moreover there is an inevitable loss of material in recrystallization, and that loss, or the expenses of recovery from mother liquors, increase with each additional recrystallization step and make the process even less economical.

I have discovered that the entire purification process can be greatly improved and made commercially more useful by reducing it to substantially three purification steps leading from the crude impure papaverine to a pharmacopoeial product. This improvement broadly comprises removing the more readily separable bulk of the impurities, for instance by recrystallization from water of a suitable salt of papaverine such as the acid oxalate with the aid of a decolorizing agent such as activated carbon which is normally accomplished by not more than two recrystallizations; bleaching the free base liberated from the salt, and passing it dissolved in an organic solvent through an adsorbent such as activated alumina, precipitating the papaverine hydrochloride from the solution by means of hydrochloric acid, and recrystallizing the papaverine HCl salt.

The resulting product gives no color reaction at all with concentrated cold sulfuric acid, or only a very weak color reaction well within the minimum test required by the U. S. P.

I have also discovered that my improved purification process yields papaverine in a greatly superior physical form which as far as I am aware has not been hitherto known. Commercially available products are fluffy and difficult to handle as they do not easily flow and have a tendency to adhere firmly to any non-metallic material used for packaging and dispensing them. My purified papaverine hydrochloride is a granular powder which has no tendency for adherence to non-metallic materials and is free-flowing. It therefore solves a problem which has hitherto been very bothersome in the use of this alkaloid.

The following examples illustrate my invention:

EXAMPLE 1.—PURIFICATION OF NATURAL PAPAVERINE

PART I.—FROM CRUDE OXALATE TO ALKALOID FOR ADSORPTION COLUMN

The "crude papaverine oxalate" which is the starting point in this process is a brown solid. It is obtained from a methanolic extract of the benzene-soluble portion of the total alkaloids of opium by the addition thereto of oxalic acid which precipitates the powder.

*First recrystallization of papaverine oxalate*

100 lbs. of crude papaverine oxalate are dissolved in 135 gallons of boiling water. Five pounds of activated carbon are added, and the solution is boiled with stirring for at least 30 minutes. It is filtered hot, and the filtrate is chilled to 20° C. The mass of crystals thus formed is filtered and slurry-washed with a small amount of cold water.

*Second recrystallization of papaverine oxalate*

The same process is employed in this step using 120 gallons of water and 4.5 lbs. of activated carbon. The oxalate is slurry-washed twice.

*Liberation of alkaloid*

The second oxalate is dissolved or suspended in 100 gallons of water at 70° C. or higher. Soda ash is added cautiously with good stirring. When the pH is 7-8 one ounce of sodium hydrosulfite is added and then soda ash to pH 8-9. The precipitated alkaloid is light-tan to white in color, and the liquor pale yellow-green. The solution is cooled to room temperature, the resulting precipitate filtered, slurry-washed free of alkali, and dried at 50° C. overnight.

*Treatment of first oxalate liquor and recovered papaverine*

The combined filtrate and washings are stirred well at room temperature, and $Na_2CO_3.1\ H_2O$ is added portion-wise to pH 8-9. When the solution is on the alkaline side, a few grams of sodium hydrosulfite are added and the gummy precipitate is rubbed to induce it to crystallize. The mixture is allowed to stand overnight; at that time all the recovered papaverine will be solid. It is filtered and washed free of alkali. The filtrate and washings are discarded.

The recovered papaverine is treated with the theoretical quantity of oxalic acid and enough water so that the papaverine oxalate formed will be in solution hot (11 ml./gm. oxalate). The mixture is heated until all the papaverine is dissolved, charcoaled with 5% activated carbon, filtered hot, and the filtrate cooled to 20° C. The papaverine oxalate is filtered off and added to crude papaverine oxalate. Any alkaloid left in the filtrate is recovered by the above procedure, and returned to the benzene-soluble portion of the total alkaloids of opium above referred to.

*Treatment of second oxalate liquor and of recovered papaverine*

The treatment of the second liquor is the same as that of the first liquor. The hot solution of papaverine oxalate thus recovered is added to the solution of once-recrystallized papaverine being readied for the second recrystallization.

PART II.—ADSORPTION COLUMN AND CONVERSION OF PAPAVERINE TO HYDROCHLORIDE

*Preparation of the papaverine solution*

The papaverine made from twice-recrystallized oxalate is dissolved in dry clean ethylene chloride using 9 ml. per gram. The solution is filtered to remove charcoal or other foreign material. The solution is colorless to pale yellow.

*Adsorption column treatment*

Fresh ethylene chloride is allowed to run through activated alumina of approximately 80-120 mesh arranged in a column until the solvent begins to emerge from the bottom of the column. The solution of papaverine in ethylene chloride prepared as above is then allowed to run through the column continuously. A broad colored band under a darkened area will be observed in the alumina; at the end of the entire throughput the band has moved down the column. The papaverine held in the column is then washed out by passing fresh ethylene chloride thru it.

*Precipitation of crude papaverine hydrochloride*

The ethylene dichloride solution that has passed thru the column is chilled and stirred. Concentrated HCl is then added slowly. The hydrochloride may precipitate as an oil first but upon stirring will be completely granular. It is filtered and dried in air.

*Preparation of finished hydrochloride*

The crude hydrochloride is dried and dissolved in boiling methanol (12.5 ml. per gram). (This solution may be filtered to remove final floaters.) The solution is then chilled to 10° C. and filtered. The solid papaverine hydrochloride is washed with a small amount of cold methanol and dried. It is colorless in concentrated sulfuric acid solution. The methanolic liquor is concentrated to ¼ of the original volume used and a second crop of hydrochloride is removed at 10° C. This product likewise passes all U. S. P. XIII tests including the formerly troublesome "cryptopine" test.

Papaverine is recovered from the final methanolic liquor by adding 1¼ liters water per liter methanol and then strong KOH solution to pH 10. The recovered papaverine must be recycled thru the alumina column.

EXAMPLE 2.—PURIFICATION OF SYNTHETIC PAPAVERINE

The crude material used in this process prepared according to the method of Kindler and Peschke, Arch. Pharm. 272, 236–41 (1934), was a light-tan synthetic material giving a bright red coloration with cold concentrated sulfuric acid.

To 100 g. of the crude material are added 38 grams of oxalic acid, 1500 ml. of water and 5 g. of decolorizing carbon. The mixture is boiled for ½ hour and filtered hot. The oxalate is removed by filtration. It is equivalent to "once-recrystallized papaverine oxalate" obtained in the purification of natural papaverine, and is further purified and converted into the hydrochloride in the manner described in the preceding example.

My invention has resulted in a number of essential improvements.

It provides a method which as far as I know is the first one in the history of this art to be fully adapted to the needs of an economical and reliable process in the production of Papaverine Hydrochloride U. S. P. from crude papaverine oxalate.

It requires no elaborate pre-purification of a crude material leading to a "commercial" product still giving a strong color reaction which must be eliminated by further refinement to obtain the U. S. P. product. Instead, my method covers the entire range of purification from the crude to the U. S. P. product in one unit process in such a manner that it has reduced normal production time from the previous 3–4 months to about one week and consistently yields a product of U. S. P. purity.

In addition, my method has completely eliminated the heretofore unavoidable loss of fairly substantial amounts of papaverine recovered from oxalate mother liquors. This material contains the accumulated impurities of the many recrystallizations in large amounts, and could not be further purified economically. I have found, on the other hand, that it is entirely economical to purify the only two oxalate liquors obtained in my present method, as shown in Example 1.

My method gives a very high recovery of Papaverine Hydrochloride U. S. P. Starting from a crude papaverine oxalate assayed for a papaverine content of 92% I found that Papaverine Hydrochloride U. S. P. was produced in a yield of better than 85%, and that the total recovery of papaverine is about 94%.

In further evaluating my new process I found that purification of my crude papaverine oxalate, or of crude papaverine liberated therefrom, directly in the adsorbent column without preceding recrystallization of the crude oxalate gives no satisfactory results. Only a very small amount of material could be passed through an $Al_2O_3$ column before impurities broke through. This procedure did not appear practical.

The impurities which can be removed by aqueous recrystallization of the crude oxalate must be eliminated before the adsorbent treatment. I found that even five recrystallizations of the crude oxalate still did not lead to a product of U. S. P. color reaction. The alkaloid liberated from this material had a reddish coloration and still included impurities which impaired the efficiency of the alumina column.

However, in trying to improve the efficacy of the alumina treatment I discovered that if a bleaching agent such as $Na_2S_2O_4$ was added to the reaction mixture when papaverine oxalate was converted to the alkaloid, as shown in my Example I, the impurities which had previously impaired the use of the alumina column were apparently destroyed. It was then possible to pass relatively large quantities of papaverine through the column before break-through of impurities occurred.

I also discovered that this improvement was obtained even after only the two oxalate recrystallizations of Example I resulting in a light-tan to white product after liberation of the alkaloid. The number of recrystallization steps previously thought necessary was thus considerably shortened and a substantial saving in operating time and expense was brought about.

Attempts to destroy by the bleaching agent the coloring principle removed in the alumina column were unsuccessful.

The isolation of the papaverine hydrochloride from the effluent solution emerging from the alumina column can be attempted in various ways. The solution can be evaporated to dryness, the residue slurried with methanol, and concentrated hydrochloric acid be added. I have found, however, that the resulting hydrochloride develops a "cryptopine" test with sulfuric acid, and even though the test is positive only erratically, its occurrence suggests that evaporation to dryness of the solution has an adverse effect on the purity of the papaverine hydrochloride. I have discovered that this danger is completely avoided and the "cryptopine" test is consistently negative if the hydrochloride is isolated from the effluent solution by direct precipitation with concentrated hydrochloric acid, as described in part II of my Example I. The hydrochloride thus obtained is a white, granular, easy-flowing product fully responsive to all requirements of the U. S. P. XIII.

In carrying out my invention I am not limited to the reactants and operating conditions described above.

Instead of using oxalic acid for the recrystallization of crude papaverine I may use any other compound capable of forming with the crude papaverine a salt insoluble in cold, but fairly soluble in hot water, such as succinic acid, ferricyanide, and the sodium or potassium thiocyanate. For the bleaching, sulfur dioxide can be employed instead of sodium hydrosulfite. The solvent which carries the free base through the chromatographing column will be, in general, one capable of dissolving substantial quantities of the base but not reacting with it, compatible with the adsorbent of the chromatographing column, and a poor solvent for papaverine hydrochloride and stable toward cold concentrated hydrochloric acid. I have successfully used the chlorinated hydrocarbons chloroform, ethylene dichloride, and tetrachloroethane.

These and other reactants and the operating conditions specified in the foregoing examples can be modified in various ways to perform my improved purification process to best advantage. They are controlled by the nature, amount and distribution of the impurities in various grades of crude impure papaverine, and by the purpose of performing each purification step and the final isolation of papaverine hydrochloride at maximum efficiency for each grade subjected to the process. I consider such variations and modifications to be within the scope of my invention and covered by the appended claims.

I claim:

1. Improved manufacture of pure papaverine hydrochloride which comprises dissolving in boiling water a crude papaverine salt insoluble in cold and fairly soluble in hot water, treating the boiling solution with a decolorizing agent, filtering and chilling it, filtering the precipitated salt crystals, washing them with cold water, and repeating said recrystallization from boiling water once; dissolving the twice recrystallized salt in hot water, stirring the solution while alkalinizing it to pH 7-8, adding a small amount of sodium hydrosulfite, and further alkalinizing the solution to pH 8-9 whereby the free base is precipitated; filtering the base, washing and drying it, dissolving it in a chlorinated hydrocarbon solvent, filtering the solution and running it thru a column of activated alumina previously flushed with the said chlorinated hydrocarbon solvent; then chilling the eluate, adding concentrated hydrochloric acid slowly with stirring whereby papaverine hydrochloride is precipitated, and recrystallizing the hydrochloride once from methanol.

2. The process of claim 1 in which the halogenated hydrocarbon solvent is ethylene dichloride.

3. The process of claim 1 in which the salt is the acid oxalate of impure papaverine.

4. Improved manufacture of pure papaverine hydrochloride which comprises dissolving in boiling water a crude papaverine acid oxalate, treating the boiling solution with active carbon, filtering and chilling it, filtering the precipitated crystals of papaverine oxalate, washing them with cold water, and repeating said recrystallization from boiling water once; dissolving the twice recrystallized salt in hot water, stirring the solution while alkalinizing it with soda ash to pH 7-8, adding a small amount of sodium hydrosulfite, and further adding soda ash to pH 8-9, whereby the free base is precipitated; filtering the base, washing and drying it, and passing it dissolved in ethylene dichloride through a chromatographing column of active alumina of from 80-120 mesh, which has previously been flushed with fresh ethylene dichloride; then chilling the eluate, adding concentrated hydrochloric acid slowly with stirring whereby papaverine hydrochloride is precipitated, and recrystallizing the hydrochloride once from methanol.

MANUEL M. BAIZER.

REFERENCES CITED

The following references are of record in the file of this patent:

Pictet et al., Berichte, vol. 43, pp. 1329–1335 (1910).

Small et al., Chemistry of the Opium Alkaloids (U. S. Gov't. Printing Office, 1932), page 18.

U. S. Pharmacopoeia, XIII, pp. 376–377 (1947).